Jan. 15, 1957     D. GRUDIN     2,777,652
RETRACTIBLE TANDEM WHEEL LANDING GEAR
Filed Feb. 2, 1954     5 Sheets-Sheet 1
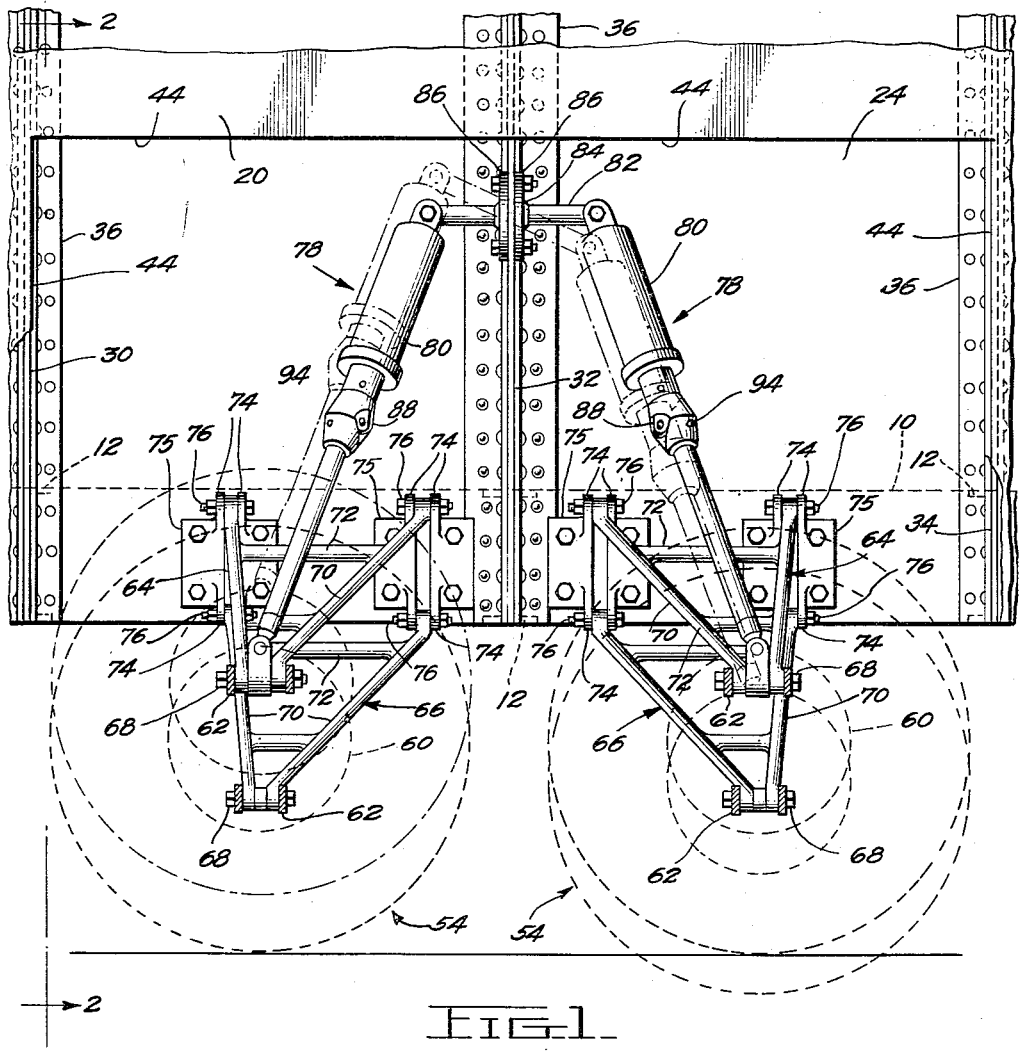
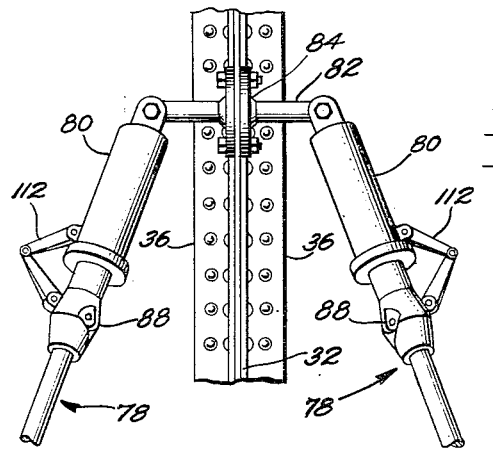
INVENTOR
*Daniel Grudin*
BY
ATTORNEY INVENTOR
Daniel Grudin

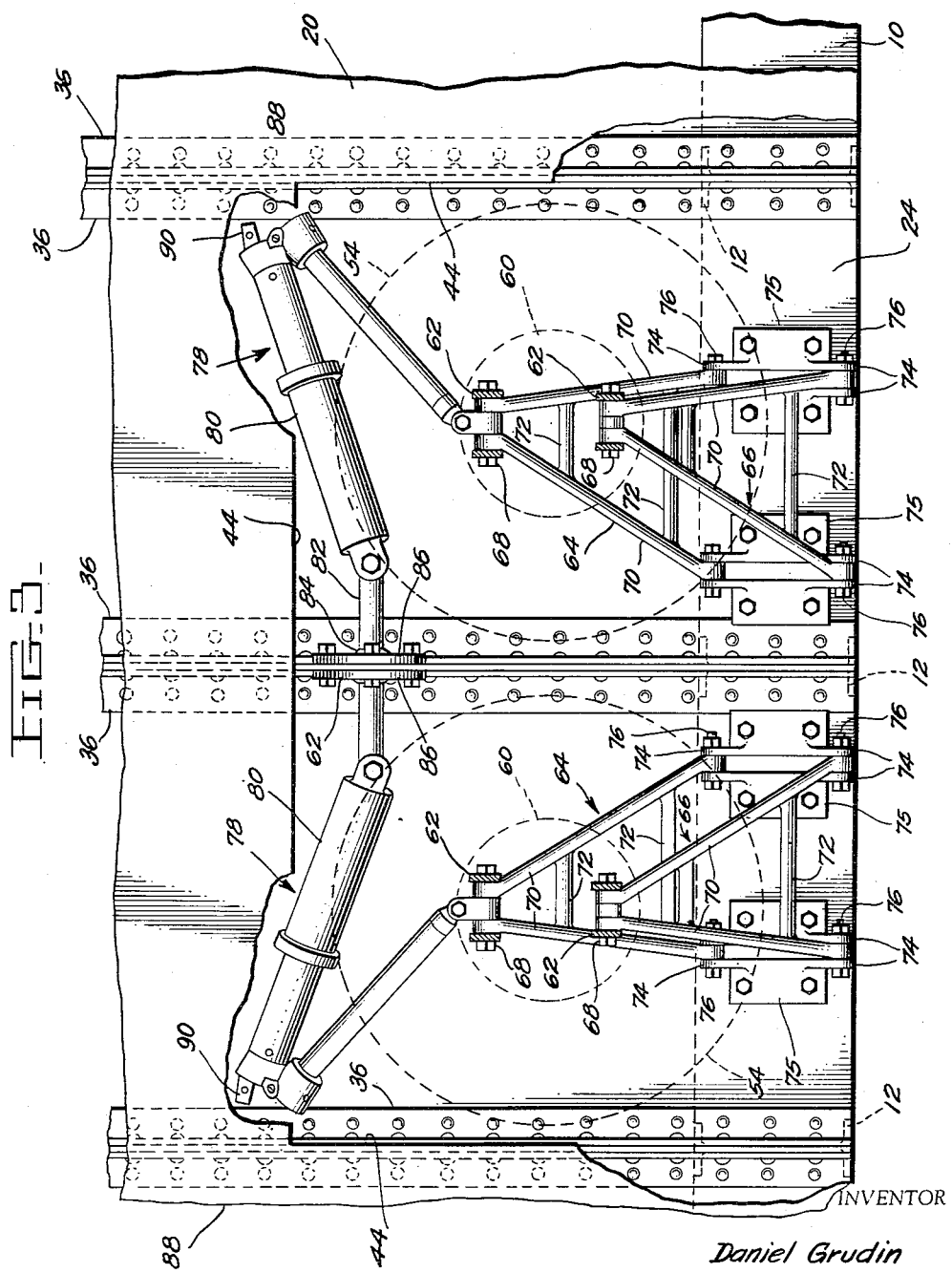

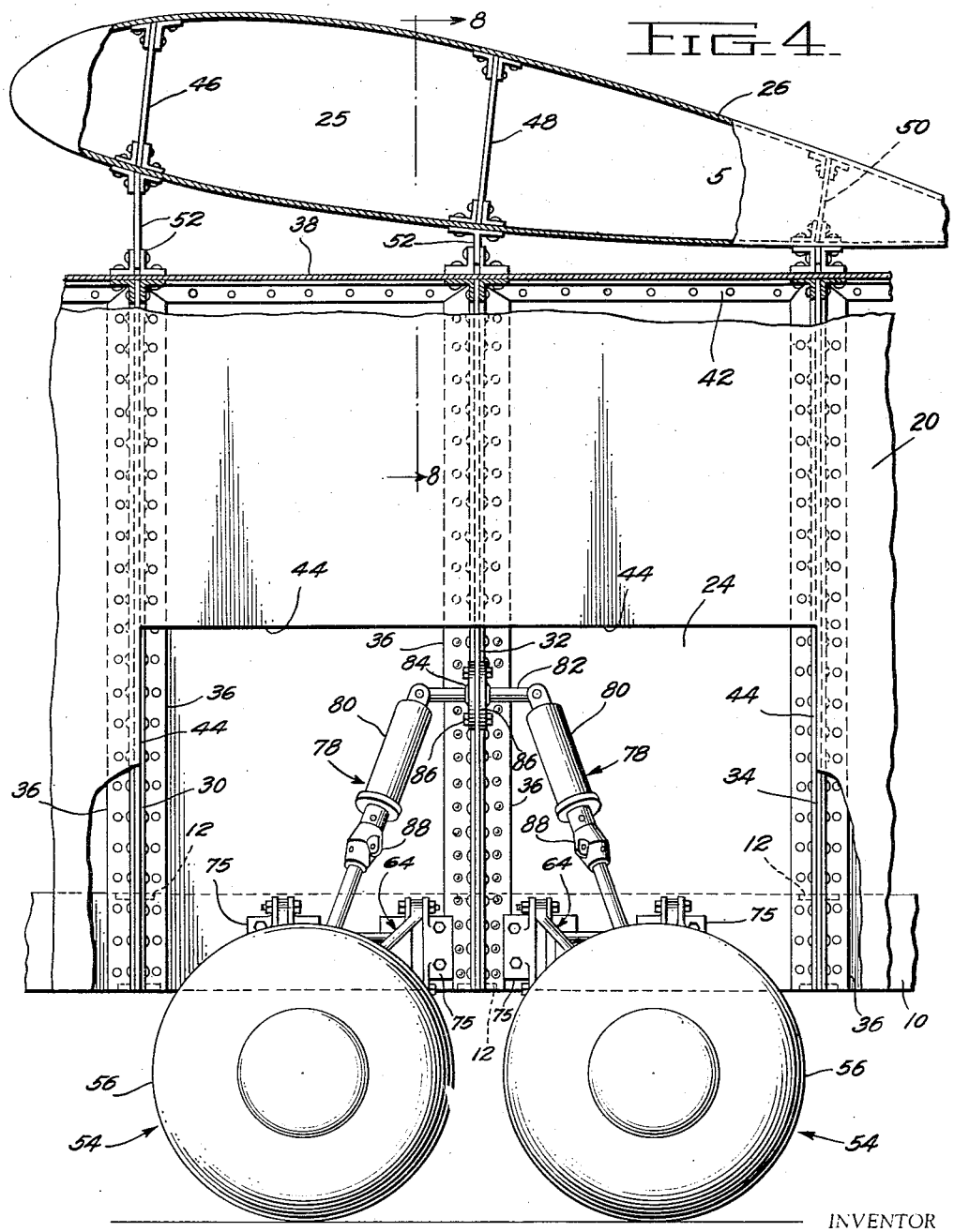

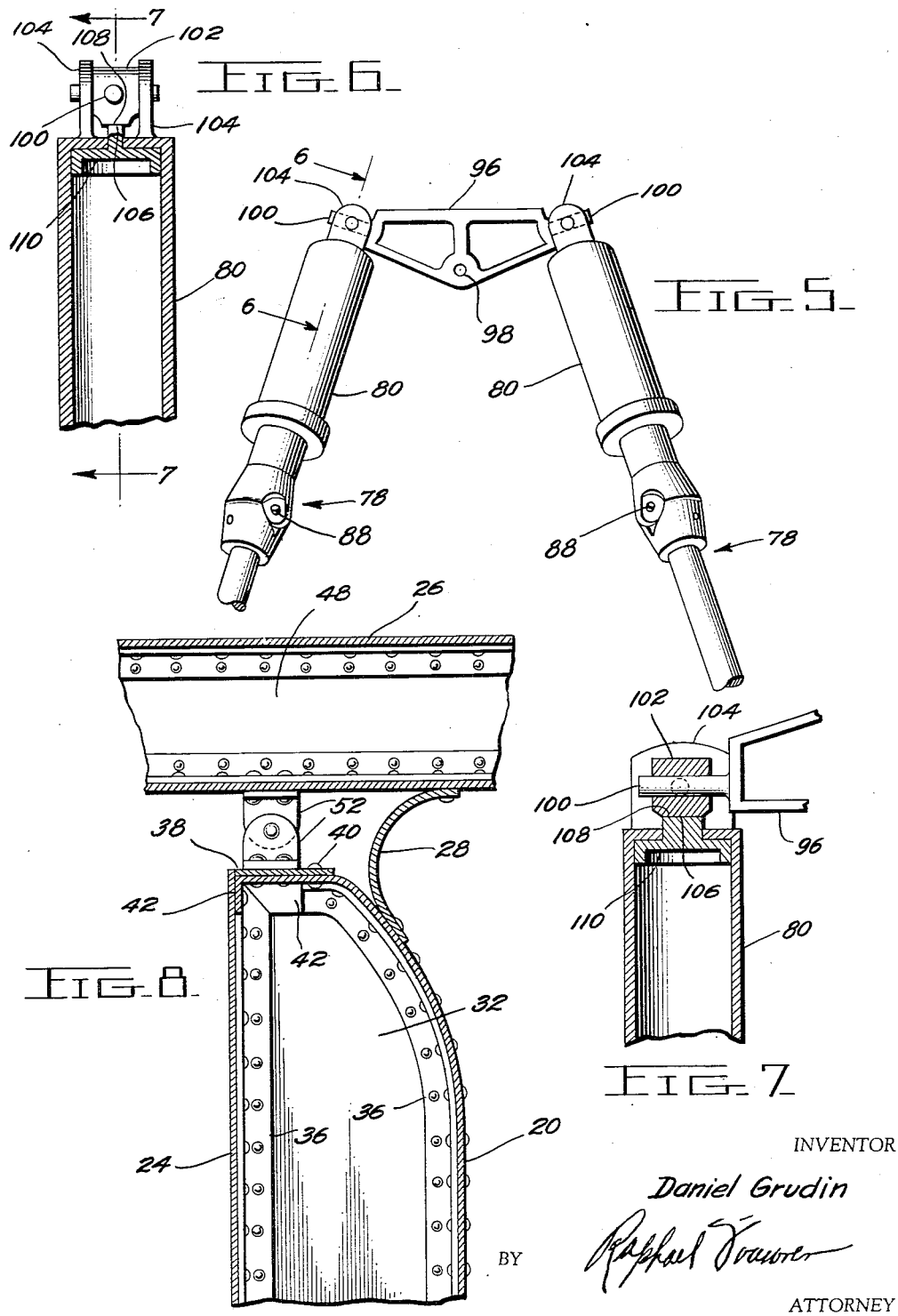

United States Patent Office 2,777,652
Patented Jan. 15, 1957

2,777,652

RETRACTIBLE TANDEM WHEEL LANDING GEAR

Daniel Grudin, Trenton, N. J., assignor to Stroukoff Aircraft Corporation, West Trenton, N. J., a corporation of New York Application February 2, 1954, Serial No. 407,757

16 Claims. (Cl. 244—104)

This invention relates to landing gear for aircraft, and more particularly to an improved landing gear for large aircraft.

With the advent of large aircraft, multiple wheel arrangements have become essential in order to reduce wheel size. However, landing gear having multiple wheel arrangements must be constructed so that the total load is equally distributed among the several wheels at all times. The parallel mounting arrangement, wherein two or more wheels are supported side by side on a common axle, or on aligned axles, meets this requirement fairly well. Still, a parallel wheel mounting possesses retracting drawbacks some of which are outlined, for example, in U. S. Patent No. 2,490,485 to Spaeth.

In order to overcome the retracting drawbacks of parallel wheel mountings, tandem wheel arrangements have been evolved. However, prior tandem wheel landing gear are subject to certain disadvantages. For example, one form of such gear has a single strut supporting a pair of tandem wheels. Hence the strut must be strong enough to withstand not only vertical but also both drag and side loads. As a result, the gear is unduly heavy because of the necessarily large size of the strut. In another prior type of tandem wheel landing gear, the weight problem is overcome by the use of links to take the drag and side loads, but the "equal load distribution" requirement is not met.

Further, even tandem wheel landing gear possesses retracting drawbacks. Although aircraft have increased tremendously in size and weight, the higher speeds of present day aircraft have resulted in disproportionately smaller increases in wing thickness. Hence, sufficient storage space in the wing is frequently unavailable even for tandem wheel landing gear upon retraction thereof in flight.

Accordingly, it is an object of this invention to provide an improved multiple wheel landing gear in which the total load is equally shared among the several wheels of each gear.

It is another object of this invention to provide a landing gear which meets the above object with a minimum of gear weight.

It is another object of this invention to provide an improved tandem wheel landing gear of minimum weight and in which the total load is equally shared among the several wheels of each gear.

It is another object of this invention to provide an improved tandem wheel landing gear that is retractible into the fuselage of an aircraft and, when extended, is supported thereon.

It is still another object of this invention to provide a rectractible tandem wheel landing gear that meets the above objects and wherein landing stresses are transmitted through fuselage bulkheads directly to wing spars.

It is a further object of this invention to provide an improved retractible tandem wheel landing gear that is simple in design with consequent manufacturing economies, yet extremely effective for its intended purpose.

Other objects and advantages of the invention will become apparent from the following description and accompanying drawings, in which:

Figure 1 is a fragmentary side view of an aircraft having landing gear embodying this invention attached thereto; the wheel parts being broken away and shown in dotted outline to show details.

Figure 3 is a view corresponding to Figure 1 but showing the gear in retracted position and with parts broken away and other parts shown in dotted outline to show details.

Figure 4 is a view corresponding to Figure 1 but showing more of the aircraft to illustrate the integration of the landing gear with the wing spars.

Figure 5 is a fragmentary side view of a modified form of landing gear embodying this invention.

Figure 6 is a fragmentary sectional view taken on line 6—6 of Figure 5.

Figure 7 is a sectional view taken on line 7—7 of Figure 6.

Figure 8 is a sectional view taken on line 8—8 of Figure 4.

Figure 9 is a fragmentary view corresponding to Figure 1 but showing a modification of the invention.

Figure 2:
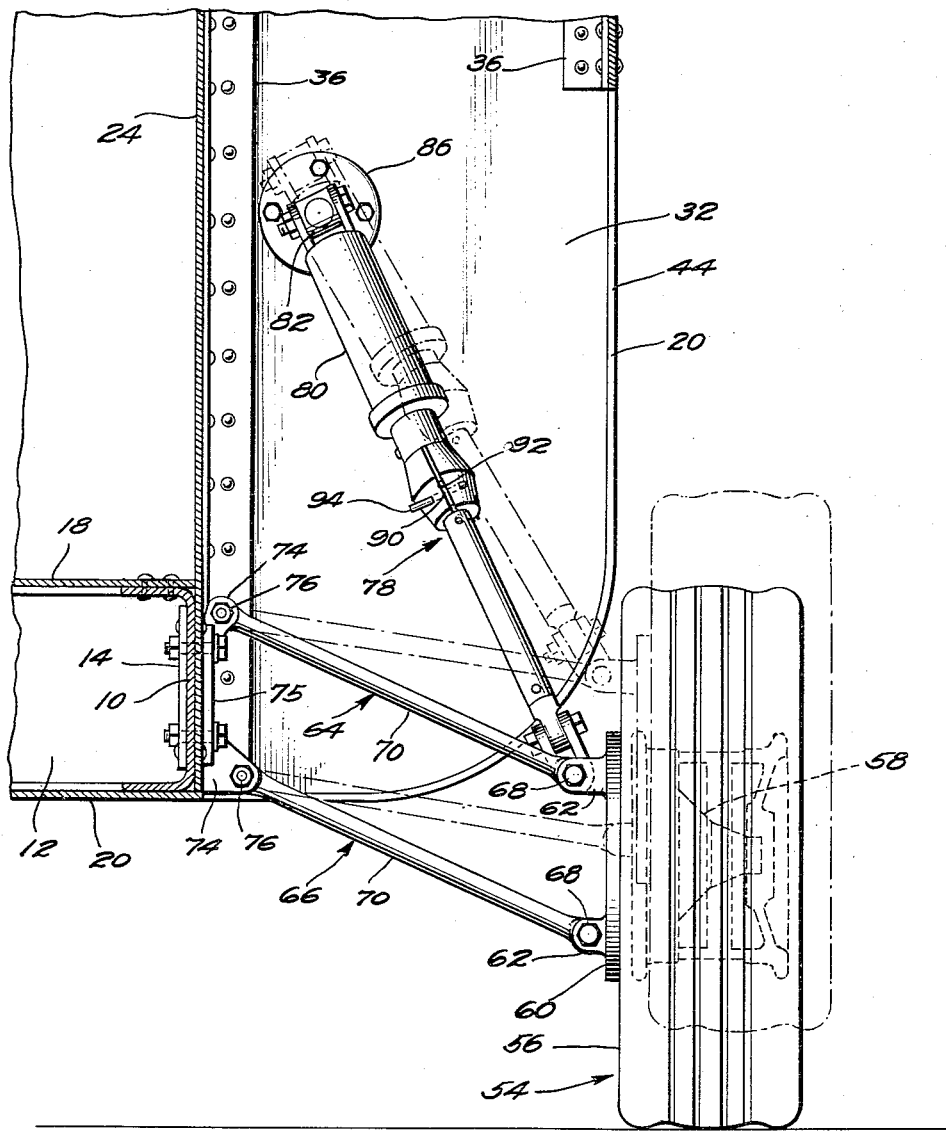
Figure 2 is a sectional view taken on line 2—2 of Figure 1.

Referring now to Figures 1 to 4 of the drawings, there is shown a portion of an aircraft fuselage having a longitudinal lower side member or sill 10 in the form of a channel, one on each side of the fuselage, and lower transverse members or joists 12 in the form of I beams or channels. The transverse members 12 are cut away at their ends to fit into the sill 10, as shown in Figure 2, and flanged at their ends, as at 14, for securement, as by rivets, to the vertical web of the sill 10. Flooring 18 rests on the transverse members 12, while the fuselage skin 20 covers the underside thereof. Secured, as by rivets to the outer face of the sill 10 is the lower edge of a longitudinally-extending panel-like upright interior fuselage wall 24. The skin 20 extends outwardly from the sill 10 and thence upwardly and inwardly in a smooth curve (Figures 2 and 8) to a level somewhat below the wing 26 (Figure 4) and spaced laterally outwardly from the fuselage wall 24. Fairing 28 smoothly blends the skin 20 with the undersurface of the wing 26.

Transversely spanning the space between the fuselage wall 24 and the skin 20, on each side of the fuselage, are three longitudinally-spaced fuslage bulkheads, 30, 32, and 34 secured by riveted edge angles 36 to the wall 24, sill 10, and skin 20. A horizontal longitudinally-extending plate-like member 38 (Figure 8) extends across the top of the bulkheads and is secured, as by rivets 40 to the upper edge of the skin 20. The member 38 is also secured as by riveted edge angles 42, to the wall 24 and the upper edges of the bulkheads 30, 32 and 34. Thus, the wall, skin, bulkheads and member 38 form two rigid compartments or boxes for the reception of landing wheels, later described. The skin 20 is cut away at the bottom of the boxes and part way up their outer sides (as at 44) to provide openings for the retraction of the wheels thereinto. The box openings, however, are provided with doors (not shown) for completely closing the boxes in flight.

The bulkheads 30, 32, and 34 are spaced longitudinally for connection to the sill 10 at locations opposed to the ends of certain of the joists 12, while other joists are located between the fore and intermediate bulkheads, 30 and 32 and between the intermediate and aft bulkheads 32 and 34. Further, the bulkheads are located directly beneath the fore, intermediate and aft wing spars, 46, 48 and 50, respectively. The member 38 forming the top of the wheel boxes is connected directly to the three wing spars 46, 48 and 50 by pinned or riveted overlapping lugs 52. Thus the wheel boxes are integrated with the wing 26 and capable of transmitting vertical loads of a landing gear secured thereto directly to the wing spars, as will be described later. Further, the floor transverse members 12 and sills 10 together with the flooring 18 and skin 20 there below constitute a rigid fuselage bottom box capable of bearing side or lateral loads of landing gears secured to each side thereof.

The landing gear, of which there are two, one on each side of the aircraft, comprises two wheels 54 arranged in tandem and disposed for retraction into the fore and aft fuselage boxes. Each wheel 54 has a pneumatic tire 56 and is rotatably mounted by suitable anti-friction bearings on a conical stub axle 58 (Figure 2). At its inner and larger end, each axle has secured thereto a large supporting plate 60 provided with two vertically spaced pairs of apertured pivot lugs 62. The apexes of general triangular upper and lower links or braces 64 and 66 of equal size are connected to each lug pair by pivot pins 68 for pivotal movement about parallel longitudinal axes. Each link 64 and 66 may comprise diverging side members 70 reinforced by transverse members 72. The base of each link 64 and 66 is connected at its opposite ends to longitudinally spaced points on the sill 10, by pivot lugs 74 secured thereto (by brackets 75) and pivot pins 76, for pivotal movement about aligned longitudinal axes. Thus, each wheel 54 is connected to the aircraft fuselage for upward swinging movement by a parallelogram linkage comprising the corresponding plate 60, links 64 and 66, and the sill 10. Preferably, the spacing of the joists 12 between the bulkheads 30, 32 and 34 is such as to have one at each end of the bases of the two links 64 and 66.

Connected to the upper pivot pin 68 on each plate 60 for pivotal movement about a horizontally inclined transverse axis is the lower end of a compression strut 78 which preferably has an oleo-type shock absorber 80 integral therewith. The upper ends of the two struts 78 are pivotally connected on axes parallel to their lower pivotal axes to the opposite ends of a normally-horizontal longitudinal rocker or leveling arm 82, which extends through to the intermediate fuselage bulkhead 32 and is mounted for rotation and universal movement thereon by a ball and socket connection. The ball 84 may be integral with the arm 82 while the socket is formed by opposed annular plates 86 clamped on opposite sides of an aperture in the intermediate fuselage bulkhead 32.

Each strut 78 is jointed, below its oleo 80 by an offset hinge 88. On the opposite side of each strut 78 from its hinge 88, an apertured lug 90 (Figure 3) on one strut section fits within a complementary slot 92 (Figure 2) on the other section. A pin 94 extending through the other section and through the lug 90 locks the two sections against folding. It will be seen that, on withdrawal of the pin 94, each strut 78 can be folded, i. e., will bend at its hinge 88. Preferably, appropriate controllable means (not shown) known in the art, such as a hydraulic cylinder, is employed to enable withdrawal and insertion of the locking pins 94 by the pilot.

From the construction described, it will be seen that on withdrawing the locking pins 94 the struts 78 will fold to enable the wheels to be raised and retracted to the position shown in Figure 3. Appropriate pilot-controlled power means (not shown), such as hydraulic cylinders, can be connected to the linkages, the axle plates 60, or to the struts 78 for retracting and extending the landing gear. In this connection the eccentricity of the hinges 88 relative to the centerlines of their struts 78 facilitates the application of retracting power to the struts. In their retracted position, the wheels 54 and their mounting linkages, fit within the side boxes in the fuselage.

In operation of an aircraft embodying this invention, it will be seen that the leveling arm 82 assures that the total load for the pair of wheels 54 of each gear will be uniformly distributed therebetween. For example, if in landing one wheel should touch the ground first, as indicated by the dotted line showing of the left hand wheel in Figure 1, it would be forced up, thereby rocking the arm 82 to force the other wheel down into contact with the ground, as shown in dot-dash lines in Figures 1 and 2. Likewise, if an obstruction should be encountered by the front wheel, it can and will rise but will thereupon force the rear wheel down to bear an equal share of the total load on the two wheels.

In this connection, it will be seen that if the two wheels 54 are not on the same level, torsion is applied to the leveling arm 82 by the relative angular displacement of the two compression struts 78, as illustrated in part by the dot-dash lines in Figure 2. Hence, the leveling arm 82 always resists torsionally but permits, by twisting, movement of one wheel 54 relative to the other so that the leveling arm 82 always tends to maintain the two wheels 54 in the same horizontal plane, and in effect acts as a spring to keep the two wheels on the same level, a highly desirable disposition thereof when landing. In further connection with the leveling arm 82, it will be seen that the arm rotates easily in the socket formed by the plates 86 to enable retraction and extension of the gear.

While the compression struts 78 take all vertical loads on the landing gear, and transmit such loads through the intermediate fuselage bulkhead 32 to the wheel boxes and thence to the wing spars 46, 48 and 50, the drag loads are taken almost entirely by the triangular reinforced links 64 and 66 which transmit them to the sills 10. Side loads imposed on the wheels 54 also are taken by the links 64 and 66 and transmitted to the fuselage bottom box.

In Figures 5 to 7 of the drawings there is shown a modified form of leveling arm and connection of the compression struts 78 thereto. In this modification the leveling arm 96 is mounted intermediate its ends on a transverse pivot pin or rod 98 for pivotal movement only, as contrasted to the universal mounting of the leveling arm 82 heretofore described. The arm 96 may extend through an appropriate aperture in the intermediate bulkhead 32 with the pivot rod 98 suitably secured to the latter to extend across the aperture. The opposite ends of the arm 96 terminate in pivot pins 100 mounting universal blocks 102. The pivotal axis of each block 102 relative to the arm 96 extends through the pivotal axis 98 of the latter, and, when the wheels 54 are extended, is disposed substantially perpendicular to the centerline of the corresponding strut 78. The upper end of each strut 78 has a pair of apertured ears 104 straddling the corresponding universal block 102 and connected thereto for pivotal movement about an axis extending perpendicular to a plane including the centerline of the strut 78 and the pivotal axis 100 of the block 102 relative to the arm 96. Thus, the arm 96 assures that the total load for the pair of wheels 54 of each gear will be uniformly distributed therebetween, while the universal blocks 102 permit retracting movement of the struts 78.

In order to resist the relative pivotal movement between each strut 78 and the arm 96 when the wheels 54 are displaced from the same level, a flat undersurface 106 on each universal block 102 is engaged by a corresponding flat surface 108 on the end of a plunger 110 reciprocable in the upper portion of the corresponding strut 78. The plunger 110 is urged outwardly by fluid pressure in the upper section of the oleo shock absorber 80. Hence, if the wheels 54 are not on the same level, a camming action occurs between the surfaces 106 and 108 that urges the wheels back on the same level. In this connection it will be seen that the plunger 110 could also be urged outwardly by a spring (not shown) instead of by fluid pressure.

Referring now to Figure 9 of the drawings, there is shown a modification wherein conventional torque scissors 112 are connected to the two sections of the oleo shock absorbers 80 of each strut 78 to prevent relative rotation between such sections. Thus, the struts 78 can act as torque tubes to induce additional torque into the rocker arm 82 on displacement of the wheels 54 from the same level, such additional torque increasing the spring effect of the arm 82 to return the wheels to the same level.

It thus will be seen that the objects of this invention have been fully and effectively accomplished. It will be realized, however, that the specific embodiment shown and described for the purpose of illustrating the principles of this invention is susceptible of changes without departure from such principles. Therefore, this invention comprehends all modifications encompassed by the spirit and scope of the following claims.

I claim:

1. In an aircraft having a fuselage, a landing gear assembly comprising: a pair of tandem wheels, each mounted for rotation on a separate stub axle; a pair of linkages extending laterally of the fuselage and connecting each of said axles thereto for movement in a vertical plane; a pair of compression struts, one for each of said axles and each having the lower end thereof pivotally connected to its corresponding axle; a rocker arm having the opposite ends thereof connected to the upper ends of said struts for relative angular movement between said arm and each of said struts; and means fixed to the fuselage mounting a central portion of said arm for rocking movement.

2. The structure defined in claim 1 in which the arm is a torsion arm and the fixed means mounts the arm for universal movement, and the upper ends of the struts are pivotally connected to the opposite ends of said arm.

3. The structure defined in claim 1 in which the fixed means mounts the arm for pivotal movement on a transverse axis, and including universal joints connecting the upper end of each strut to said arm.

4. The structure defined in claim 1 in which the fixed means mounts the arm for pivotal movement on a tarnsverse axis, and including universal joints connecting the upper end of each strut to said arm and means effective at said joints urging each said strut and said arm into their relative angular positions obtaining when the wheels are on the same level.

5. The structure defined in claim 1 in which each strut includes a shock-absorbing device.

6. The structure defined in claim 1 in which each compression strut is jointed to fold between its ends by an offset hinge to permit retraction of the axles and wheels by upward swinging movement on the linkages.

7. The structure defined in claim 6 including controllable means mounted on each strut to lock the latter against folding.

8. In an aircraft having a fuselage, a landing gear assembly comprising: a pair of tandem wheels, each rotatable on a separate stub axle; a pair of parallelogram linkages extending laterally of the fuselage and connecting each of said axles thereto for movement in a vertical plane; a pair of compression struts, one for each of said axles and each having the lower end thereof pivotally connected to its corresponding axle; a rocker arm having the opposite ends thereof connected to the upper ends of said struts for relative angular movement between said arm and each of said struts; and means fixed to the fuselage mounting the central portion of said arm for rocking movement.

9. The structure defined in claim 8 in which the aircraft has a wing including spars and the fuselage has a longitudinal interior wall below said wing and has skin spaced outwardly of said wall, and including three longitudinally-spaced transverse bulkheads spanning the space between said wall and skin, secured to said wall and skin, extending upwardly to wing spars and defining, with said wall and skin, wheel receiving pockets, and wherein the linkages are connected to said wall and the fixed means is secured to the intermediate of said bulkheads.

10. The structure defined in claim 8 including means defining wheel pockets in the fuselage, and in which the struts are foldable between their ends for retraction of the wheels within said pockets by upward swinging movement on the linkages.

11. The structure defined in claim 10 including controllable means mounted on each strut to lock the latter against folding.

12. In an aircraft, the combination comprising: a wing including spars; a fuselage having a longitudinal interior wall below said wing and skin spaced outwardly of said wall; three longitudinally-spaced bulkheads spanning the space between said wall and skin and secured thereto to define pockets therewith, said bulkheads extending upwardly and connected to said wing spars; a landing gear including wheels; and means connecting said landing gear to said fuselage including a linkage attached to said wall and struts attached to the intermediate of said bulkheads, whereby vertical landing loads are transmitted from said landing gear to said wing spars.

13. The structure defined in claim 12 wherein the struts are foldable for retraction of the wheels into the pockets.

14. In an aircraft having a fuselage, a landing gear assembly comprising: a pair of tandem wheels, each mounted for rotation on a separate stub axle; a pair of linkage means extending laterally of said wheels and connecting each of said axles to the fuselage for movement in a vertical plane; a pair of compression struts, one for each of said axles and each having the lower ends thereof connected to its corresponding axle; and means connecting the upper ends of both of said strut means to the fuselage for equalization of vertical loads on the assembly between said wheels.

15. The structure defined in claim 14 in which the strut means are foldable for retraction of the wheels on the connecting means.

16. The structure defined in claim 1, including means effective at the connection between each strut and the arm for urging both into their relative angular positions obtaining when the wheels are on the same level.

References Cited in the file of this patent

UNITED STATES PATENTS

| | | |
|---|---|---|
| 1,802,692 | Zindel | Apr. 28, 1931 |
| 1,847,491 | Messier | Mar. 1, 1932 |
| 1,859,624 | Grumman | May 24, 1932 |
| 1,893,695 | Chenoweth | Jan. 10, 1933 |
| 2,156,773 | Sikorsky | May 2, 1939 |
| 2,333,550 | Parker | Nov. 2, 1943 |
| 2,392,892 | Ward | Jan. 15, 1946 |
| 2,416,245 | Watter et al. | Feb. 18, 1947 |
| 2,434,464 | Lemonier et al. | Jan. 13, 1948 |
| 2,464,972 | Franchi | Mar. 22, 1949 |
| 2,578,200 | Nicholl | Dec. 11, 1951 |
| 2,579,180 | Eldred | Dec. 18, 1951 |
| 2,704,674 | Gray | Mar. 22, 1955 |

FOREIGN PATENTS

| | | |
|---|---|---|
| 306,412 | Great Britain | Jan. 23, 1930 |
| 587,268 | Germany | Nov. 1, 1933 |
| 962,452 | France | Dec. 12, 1949 |